(12) United States Patent
Tran

(10) Patent No.: US 12,124,849 B2
(45) Date of Patent: Oct. 22, 2024

(54) VECTOR PROCESSOR WITH EXTENDED VECTOR REGISTERS

(71) Applicant: Simplex Micro, Inc., San Jose, CA (US)

(72) Inventor: Thang Minh Tran, Tustin, CA (US)

(73) Assignee: Simplex Micro, Inc., Austin, TX (US)

( * ) Notice: Subject to any disclaimer, the term of this patent is extended or adjusted under 35 U.S.C. 154(b) by 27 days.

(21) Appl. No.: 18/202,928

(22) Filed: May 28, 2023

(65) Prior Publication Data

US 2024/0020119 A1    Jan. 18, 2024

Related U.S. Application Data

(60) Provisional application No. 63/368,288, filed on Jul. 13, 2022.

(51) Int. Cl.
G06F 9/30    (2018.01)
G06F 9/38    (2018.01)

(52) U.S. Cl.
CPC ........ G06F 9/30036 (2013.01); G06F 9/3856 (2023.08)

(58) Field of Classification Search
None
See application file for complete search history.

(56) References Cited

U.S. PATENT DOCUMENTS

| | | |
|---|---|---|
| 5,655,096 A | 8/1997 | Branigin |
| 5,699,536 A | 12/1997 | Hopkins et al. |
| 5,802,386 A | 9/1998 | Kahle et al. |
| 5,809,268 A | 9/1998 | Chan |
| 5,860,018 A | 1/1999 | Panwar |
| 5,881,302 A | 3/1999 | Omata |
| 5,903,919 A * | 5/1999 | Myers ................. G06F 9/30163 712/E9.035 |
| 5,958,041 A | 9/1999 | Petolino, Jr. et al. |
| 5,961,630 A | 10/1999 | Zaidi et al. |
| 5,964,867 A | 10/1999 | Anderson et al. |
| 5,996,061 A | 11/1999 | Lopez-Aguado et al. |
| 5,996,064 A | 11/1999 | Zaidi et al. |
| 6,016,540 A | 1/2000 | Zaidi et al. |
| 6,035,393 A | 3/2000 | Glew et al. |

(Continued)

FOREIGN PATENT DOCUMENTS

EP    0840213 A2    5/1998

OTHER PUBLICATIONS

Choi, W., Park, SJ., Dubois, M. (2009). Accurate Instruction Pre-scheduling in Dynamically Scheduled Processors. In: Stenström, P. (eds) Transactions on High-Performance Embedded Architectures and Compilers I. Lecture Notes in Computer Science, vol. 5470 Springer, Berlin, Heidelberg. pp. 107-127. (Year: 2009).

(Continued)

*Primary Examiner* — Eric Coleman
(74) *Attorney, Agent, or Firm* — Appleton Luff

(57) ABSTRACT

A processor includes a time counter, a vector coprocessor, and an extended vector register file for executing vector instructions and extending the data width of vector registers. The processor statically dispatches vector instructions with preset execution times based on a write time of a register in a coprocessor register scoreboard and a time counter provided to a vector execution pipeline.

25 Claims, 11 Drawing Sheets

(56) References Cited

U.S. PATENT DOCUMENTS

| | | | |
|---|---|---|---|
| 6,065,105 A | 5/2000 | Zaidi et al. | |
| 6,247,113 B1 | 6/2001 | Jaggar | |
| 6,304,955 B1 | 10/2001 | Arora | |
| 6,425,090 B1 | 7/2002 | Arimilli et al. | |
| 6,453,424 B1 | 9/2002 | Janniello | |
| 7,069,425 B1 | 6/2006 | Takahashi | |
| 8,166,281 B2 | 4/2012 | Gschwind et al. | |
| 9,256,428 B2 | 2/2016 | Heil et al. | |
| 10,339,095 B2* | 7/2019 | Moudgill | G06F 15/8053 |
| 11,062,200 B2* | 7/2021 | Lie | G06F 9/5077 |
| 11,163,582 B1* | 11/2021 | Tran | G06F 9/30098 |
| 12,061,906 B2* | 8/2024 | Stephens | G06F 9/30036 |
| 2003/0023646 A1* | 1/2003 | Lin | G06F 7/762 |
| | | | 712/E9.034 |
| 2003/0135712 A1* | 7/2003 | Theis | G06F 9/30156 |
| | | | 712/214 |
| 2006/0218124 A1 | 9/2006 | Williamson et al. | |
| 2006/0259800 A1 | 11/2006 | Maejima | |
| 2006/0288194 A1 | 12/2006 | Lewis et al. | |
| 2007/0038984 A1* | 2/2007 | Gschwind | G06F 8/447 |
| | | | 717/136 |
| 2011/0099354 A1 | 4/2011 | Takashima et al. | |
| 2013/0346985 A1 | 12/2013 | Nightingale | |
| 2014/0082626 A1 | 3/2014 | Busaba et al. | |
| 2015/0026435 A1* | 1/2015 | Muff | G06F 9/3012 |
| | | | 712/208 |
| 2015/0212972 A1* | 7/2015 | Boettcher | G06F 9/30098 |
| | | | 712/4 |
| 2015/0227369 A1 | 8/2015 | Gonion | |
| 2016/0092238 A1 | 3/2016 | Codrescu et al. | |
| 2016/0275043 A1* | 9/2016 | Grochowski | G06F 1/3293 |
| 2016/0371091 A1* | 12/2016 | Brownscheidle | G06F 9/3836 |
| 2017/0177354 A1* | 6/2017 | Ould-Ahmed-Vall | |
| | | | G06F 9/30098 |
| 2017/0357513 A1* | 12/2017 | Ayub | G06F 9/3891 |
| 2018/0196678 A1 | 7/2018 | Thompto | |
| 2019/0079764 A1* | 3/2019 | Diamond | G06N 3/08 |
| 2020/0004543 A1 | 1/2020 | Kumar et al. | |
| 2020/0319885 A1* | 10/2020 | Eyole | G06F 9/30036 |
| 2021/0026639 A1 | 1/2021 | Tekmen et al. | |

OTHER PUBLICATIONS

Diavastos, Andreas & Carlson, Trevor. (2021). Efficient Instruction Scheduling using Real-time Load Delay Tracking. (Year: 2021).

J. S. Hu, N. Vijaykrishnan and M. J. Irwin, "Exploring Wakeup-Free Instruction Scheduling," 10th International Symposium on High Performance Computer Architecture (HPCA'04), Madrid, Spain, pp. 232-232 (Year: 2004).

Written Opinion of the International Searching Authority, PCT/S2022/052185, (Aug. 3, 2023).

Written Opinion of the International Searching Authority, PCT/US2023/018970, (Oct. 26, 2023).

Written Opinion of the International Searching Authority, PCT/US2023/018996, (Nov. 2, 2023).

PCT/US2023/018970, International Preliminary Report on Patentability, Jul. 18, 2024.

PCT/US2023/018996, International Preliminary Report on Patentability, Jul. 19, 2024.

* cited by examiner

```
setvli t1, x5, e16, m8, vext=1    // Enable VRF extension
vle16.v v8, x3                     // Vector LOAD of 1024 elements
addi x3, x3, 2048                  // Address increment
vadd.vx v8, v8, t2                 // Vector ADD of 1024 elements
vmacc.v v16, v18, v8               // Vector MACC of 1024 elements
setvli t1, x5, e16, m8, vext=0    // Disable VRF extension
vle16.v v8, x3                     // Vector LOAD of 256 elements
addi x3, x3, 2048                  // Address increment
vadd.vx v8, v8, t2                 // Vector ADD of 256 elements
vmacc.v v16, v18, v8               // Vector MACC of 256 elements
```

FIG. 4A

```
setvli t1, x5, e16, m8        // Enable VRF extension
vle16.v.ce4 v8, x3            // Vector LOAD of 1024 elements
addi x3, x3, 2048             // Address increment
vadd.vx.ce4 v8, v8, t2        // Vector ADD of 1024 elements
vmacc.v.ce4 v16, v18, v8      // Vector MACC of 1024 elements
vle16.v v8, x3                // Vector LOAD of 256 elements
addi x3, x3, 2048             // Address increment
vadd.vx v8, v8, t2            // Vector ADD of 256 elements
vmacc.v v16, v18, v8          // Vector MACC of 256 elements
```

FIG. 4B

Resource Matrix 150

| Time | Rd buses | Wr buses | VALU | VLS | VMUL | VDIV |
|------|----------|----------|------|-----|------|------|
| 63 |  |  |  |  |  |  |
| 62 |  |  |  |  |  |  |
| . |  |  |  |  |  |  |
| 26 |  |  |  |  |  |  |
| 25 |  | 2 | 2 | 1 | 1 | 0 |
| 24 | 1 |  |  |  |  |  |
| . |  |  |  |  |  |  |
| 15 | 3 | 2 | 2 | 2 | 1 | 0 |
| 14 | 0 | 0 | 0 | 0 | 0 | 0 |
| . |  |  |  |  |  |  |
| 0 |  |  |  |  |  |  |

151   152   153   156   157   158 write time → 25
execute time → 25
read time → 24
time count → 15

FIG. 8

| Read Control | | |
|---|---|---|
| Time | V | Reg |
| 63 | 0 | R0 |
| 62 | 0 | R0 |
| . | 1 | R27 |
| 27 | 1 | R11 |
| 26 | 1 | R7 |
| 25 | 1 | R27 |
| . | 1 | R5 |
| 2 | 0 | R0 |
| 1 | 0 | R0 |
| 0 | 0 | R0 |

← time count (at 25)

| Write Control | | |
|---|---|---|
| Time | V | Reg |
| 63 | 0 | R0 |
| 62 | 0 | R0 |
| . | 1 | R25 |
| 28 | 1 | R14 |
| 27 | 1 | R22 |
| 26 | 1 | R30 |
| . | 1 | R5 |
| 2 | 0 | R0 |
| 1 | 0 | R0 |
| 0 | 0 | R0 |

← time count (at 26)

VECTOR PROCESSOR WITH EXTENDED VECTOR REGISTERS

RELATED APPLICATIONS

This application claims priority to U.S. provisional patent application Ser. No. 63/368,288, filed Jul. 13, 2022, and entitled "Vector Processor With Extended Vector Registers," which application is hereby incorporated by reference in its entirety.

This application is related to the following U.S. patent applications which are each hereby incorporated by reference in their entirety: U.S. patent application Ser. No. 17/588,315, filed Jan. 30, 2022, and entitled "Microprocessor with Time Counter for Statically Dispatching Instructions;" and U.S. patent application Ser. No. 17/829,909, filed Jun. 1, 2022, and entitled "Vector Coprocessor with Time Counter for Statically Dispatching Instructions."

BACKGROUND

Technical Field

The present invention relates to the field of computer processors. More particularly, it relates to issuing and executing vector instructions in a processor where the processor consists of a general-purpose microprocessor, a digital-signal processor, a single instruction multiple data processor, a vector processor, a graphics processor, or other type of microprocessor which executes instructions.

Technical Background

Processors have extended to include processing of vector instructions to improve performance of applications. In such instances, the vector register file can have a large data width, for example, of 512 bits to several thousand bits. The vector register in such implementations typically consists of many elements with a programmable element data width. For example, a vector register width of 1024 bits can have widths of 128 elements of 8-bits, 64 elements of 16-bits, 32 elements of 32-bits, or 16 elements of 64-bits. As is known, the performance is improved by operating on several elements in parallel, however, it is important to balance the performance, power and area for a vector processor. The width of the vector functional units can be the same or half or quarter of the width of the vector register. Vector functional units with wider data width provide higher performance. However, matrix multiplications often need a much larger vector register width in comparison to other applications. The row and column of the matrices for multiplication can have hundreds of elements which is impossible to keep in the vector processor.

Thus, there is a need for a vector processor which efficiently executes elements, especially matrix multiplication. A vector processor must also be flexible for configuration, programmability, and different usages.

SUMMARY

In the disclosed processor, vector registers can be grouped together to form a much wider vector register, for example grouping of 8 vector registers of VLEN=512-bit or 64-byte forms a single vector register of effective VLEN=512-byte. In one embodiment, the extended vector register file can increase the VLEN to 256-byte and can be grouped to form a vector register of effective VLEN=2048-byte. The effective VLEN=2048-byte is equivalent to 1024 elements with element length of 2-byte. For a matrix of 1024 elements in each row, two sets of 8 vector registers can be used to load two rows of the matrix and 1 set of 8 vector registers can be used to accumulate the multiplication data for the result. The extended VRF allows optimization for the specific application and specific instructions without causing the timing issue for other instructions. The performance of the vector processor is still limited by the width of the functional unit (DLEN) and the memory bandwidth.

In another embodiment, the data width of architectural vector register file is VLEN, the architectural functional unit is DLEN, the extended vector register is XVLEN, and the extended functional unit is XDLEN. The vector instructions have 3 options for execution: (1) using only VLEN registers and DLEN functional units, (2) using VLEN+XVLEN registers and DLEN functional units, and (3) using VLEN+XVLEN registers and DLEN+XDLEN functional units. The extended vector registers and functional units are optional and configurable. The architecture of the vector processor is for all vector instructions to use VLEN registers and DLEN functional units. As extended vector registers are configured, some vector instructions such as permute and divide instructions do not use the extended vector registers. In the second option, some vector instructions such as vector reduction operations use the extended vector register where the data are multiplexing with the architecture vector register for execution by the architectural functional units. In the third option, some vector instructions that are critical in performance such as vector multiply and accumulate use both the architectural and extended vector registers and functional units for operation. This customization option permits an implementer to select the hardware that is best for their application.

By way of example, the vector processor can execute 2048-bit per cycle but if the load/store port is limited to 512-bit, then the performance cannot be achieved with the extended vector registers and functional units. In another embodiment, the vector data memory is an extension of the vector registers for matrix multiplication. Each row of a matrix can have 100 elements where the vector registers are not sufficient to hold all elements for the matrix multiplication. The rows of the matrix are loaded repeatedly many times for multiplication, the vector data memory keeps all data of one matrix to avoid fetching same data several times. In some applications, the matrix can be 1 MB which is reasonable to keep in the vector data memory. The vector memory is a back-side vector memory where the whole VLEN+XVLEN data can be fetched and written directly into the vector register and extended vector registers in 1 clock cycle. In another application, the matrix can be 1 GB which is much too large for the vector data memory. The vector data memory can be used as a prefetch buffer for loading matrix data from various sources as a way of software pipelining or keeping part of the matrix, i.e., 1 out of every 8 rows of the matrix. The advantage is reducing memory traffic and allowing any delay in the memory fetch while keeping the VPU busy. The disclosed embodiments use a processor and vector coprocessor with a time counter and a method for statically dispatching instructions to an execution pipeline with preset execution times based on a time count from a counter.

The disclosed microprocessor design employs static scheduling of instructions which is extended to a vector coprocessor. A static scheduling algorithm is based on the assumption that a new instruction has a perfect view of all previous instructions in the execution pipeline, and thus it can be scheduled for execution at an exact time in the future, e.g., with reference to a time count from a counter. Assuming an instruction has 2 source operands and 1 destination operand, the instruction can be executed out-of-order when conditions are met of (1) no data dependencies, (2) availability of read buses to read data from the register file, (3) availability of a functional unit to execute the instruction, and (4) availability of a write bus to write result data back to the register file. The static scheduling issues both baseline and extended instructions as long as the above four conditions are met. The time counter can be frozen if the result data does not return at the expected time.

The four conditions above are associated with time: (1) a time when all data dependencies are resolved, (2) at which time the read buses are available to read source operands from a register file, (3) at which subsequent time the functional unit is available to execute the instruction, and (4) at which further subsequent time the write bus is available to write result data back to the register file.

In one embodiment, an extended vector register file is added to increase the vector register width which is especially useful in matrix multiplication. The vector register width can be architected to be 512-bit which is referred to as VLEN of 512-bit. The extended vector register file can emulate a vector processor with much wider VLEN which is a multiple of the architected VLEN. The VLEN extension can be for all the vector registers or partial number of vector registers. For example, the extended register file can be programmed to increase VLEN for all vector registers or half the number of vector registers. Without extension, vector processor executes vector instruction with VLEN of 512-bit and vector functional unit of 512-bits. If the vector register VLEN is incremented to 1024-bit, then two cycles are needed to complete execution of the vector instruction. It is noted that the extended vector registers can be physically in different location and not in the execution data path, in which case an extra cycle is needed to route the second half of the vector register to the vector functional units. The timing for reading and executing of the 1024-bit vector register works out perfectly with the 512-bit vector functional unit where the 512-bit of data from the vector register file are sent to the vector functional unit for execution in the first cycle while the 512-bit of data from the extended register file take an extra cycle. The extended vector registers can be enabled by many different methods: (1) custom instructions with specific modified VLEN, (2) programming a control register to enable different VLEN, (3) only selected instructions can use 1024-bit VLEN, other instructions are still 512-bit VLEN. Herein (1) "configure" means that the extended vector registers are added to the vector processor at build time and cannot be changed at later time, (2) "program" means that different usages of the extended registers can be set up depended on the applications.

BRIEF DESCRIPTION OF THE DRAWINGS

Aspects of the present invention are best understood from the following description when read with the accompanying figures.

FIG. 4A and FIG. 4B are examples of modified instructions that use an extended vector register;

FIG. 8 is a block diagram illustrating an embodiment of a time-resource matrix;

FIG. 9A and FIG. 9B are block diagrams illustrating an example of operation of a read bus control and a write bus control.

DETAILED DESCRIPTION

Figure 1:
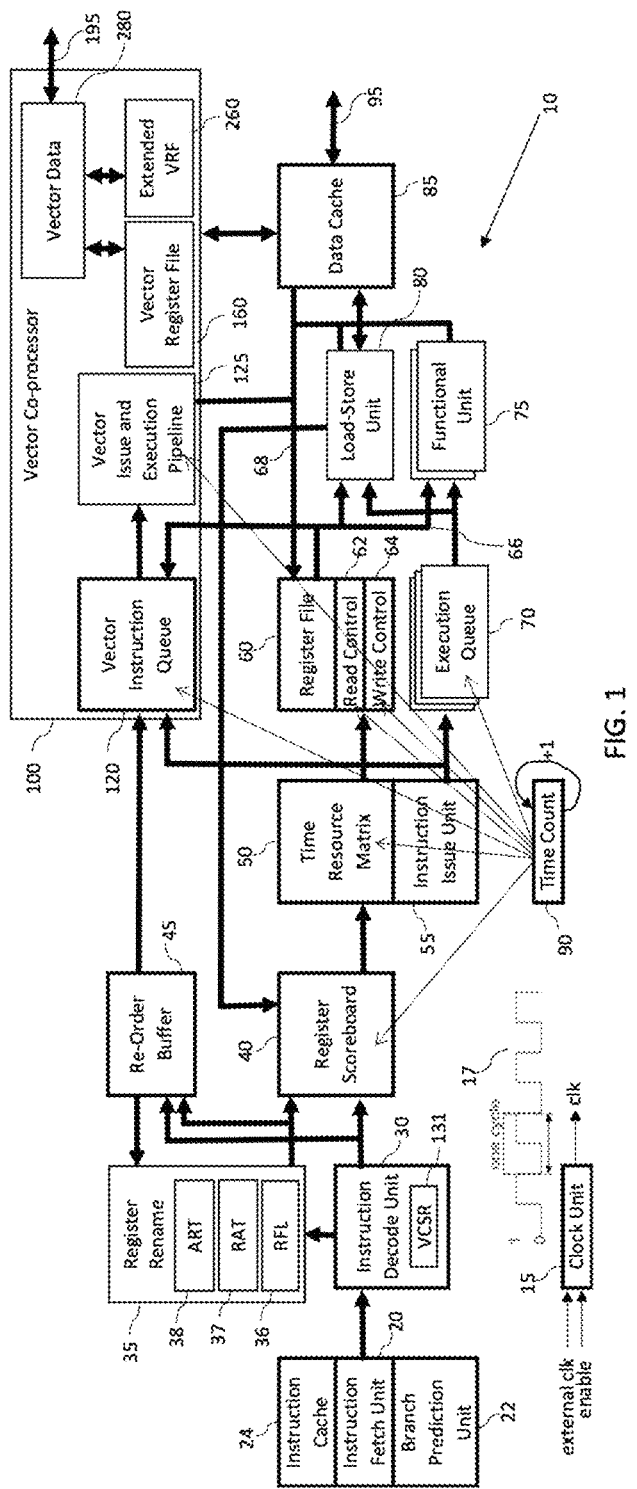
FIG. 1 is a block diagram illustrating a processor based data processing system in accordance with a preferred embodiment of the present invention.

The following description provides different embodiments for implementing aspects of the present invention. Specific examples of components and arrangements are described below to simplify the explanation. These are merely examples and are not intended to be limiting. For example, the description of a first component coupled to a second component includes embodiments in which the two components are directly connected, as well as embodiments in which an additional component is disposed between the first and second components. In addition, the present disclosure repeats reference numerals in various examples. This repetition is for the purpose of clarity and does not in itself require an identical relationship between the embodiments.

In one embodiment, a processor is provided, typically implemented as a microprocessor, that schedules instructions to be executed at a preset time based on a time count from a time counter. In such a microprocessor the instructions are scheduled to be executed using the known throughput and latency of each instruction to be executed. For example, in one embodiment, the ALU instructions have throughput and latency times of 1, the multiply instructions have throughput time of 1 and the latency time of 2, the load instructions have the throughput time of 1 and latency time of 3 (based on a data cache hit), and the divide instruction have throughput and latency times of 32.

FIG. 1 is a block diagram of a microprocessor based data processing system. The exemplary system includes a microprocessor 10 having a clock unit 15, an instruction fetch unit 20, a branch prediction unit 22, an instruction cache 24, an instruction decode unit 30, a register renaming unit 35, a register scoreboard 40, re-order buffers 45, a time-resource matrix 50, an instruction issue unit 55, a register file 60, a read control unit 62, a write control unit 64, a plurality of execution queues 70, a plurality of functional units 75, a load-store unit 80, a data cache 85 and a vector coprocessor 100. The microprocessor 10 includes a plurality of read buses 66 connecting the register file 60 to the vector instruction queue 120 of the vector coprocessor 100, the functional units 75 and load-store unit 80. The system also includes a plurality of write buses 68 to write result data from the vector issue and execution pipeline unit 125 of the vector coprocessor 100, the functional units 75, the load-store unit 80, and the data cache 85 to the register file 60. The re-order buffer 45 is used to track the order of the instructions as they are decoded in order from the instruction decode unit 30. The vector issue and execution pipeline 125 is coupled to the vector register file 160 (VRF) and extended vector register file (EVRF) 260. The register width of the VRF 160 is the basic vector register width while the extended VRF increases the vector register width as part of the hardware acceleration for specific application. The vector register file 160 and the extended vector register file 260 are coupled to the vector data memory 280 for fast accessing of matrix data which is used for matrix multiplication or similar applications. The buses 95 and 195 couple the processor 10 to the external memories and peripherals for necessary data if the data are not in the data cache 85 or vector data memory 280.

The instructions can be executed out-of-order and the re-order buffer 45 retires instructions in-order to the architectural register table (ART) 38 of the register rename unit 35. The vector instructions are committed in-order by the re-order buffer 45 where "commit" means the vector instruction is valid and cannot be flushed by branch misprediction. Herein (1) "complete" means that the instruction is executed with the result data which can be written into a temporary register, an architectural register, or a register file, (2) "commit" means that the instruction cannot be flushed, the instruction can be executed and written back to the architectural register at any time, (3) "retire" means that the result data is written back to the architectural register or the temporary register is renamed as an architectural register through the ART 38. In the microprocessor 10, the vector instructions are committed by the re-order buffer 45, then the vector instructions will be executed and completed possibly out-of-order (i.e., one vector instruction can be executed out-of-order with respect to another vector instruction) and retired to the vector register file in the vector coprocessor 100.

Microprocessor 10 is a synchronous microprocessor where the clock unit generates a clock signal ("clk") which couples to all the units in the microprocessor 10. The clock unit 15 provides a continuously toggling logic signal 17 which toggles between 0 and 1 repeatedly at a clock frequency. Clock output signal ("clk") of clock unit 15 enables synchronization of the many different units and states in the microprocessor 10. The clock signal is used to sequence data and instructions through the units that perform the various computations in the microprocessor 10. The clock unit 15 may include an external clock as input to synchronize the microprocessor 10 with external units (not shown). The clock unit 15 may further include an enable signal to disable the clock unit when the microprocessor is in an idle stage or not used for instruction execution.

According to an embodiment the microprocessor 10 also includes a time counter unit 90 which stores a time count incremented, in one embodiment, every clock cycle. The time counter unit 90 is coupled to the clock unit 15 and uses "clk" signal to increment the time count.

In one embodiment the time count represents the time in clock cycles when an instruction in the instruction issue unit 55 is scheduled for execution. For example, if the current time count is 5 and an instruction is scheduled to be execute later in 22 cycles, then the instruction is sent to the execution queue 70 with the execution time count of 27. When the time count increments to 26, the execution queue 70 issues the instruction to the functional unit 75 for execution in the next cycle (time count 27). The time counter unit 90 is coupled to the register scoreboard 40, the time-resource matrix 50, the read control 62, the write control 64, and the plurality of execution queues 70.

The register scoreboard 40 resolves data dependencies in the instructions. The time-resource matrix 50 checks availability of the various resources, which in one embodiment includes the read buses 66, the functional units 75, the load-store unit 80, and the write buses 68. The read control unit 62, the write control unit 64, and the execution queues 70 receive the scheduled times for reads, writes and execution, respectively, from the instruction issue unit 55. The read control unit 62 is set to read the source operands from the register file 60 on specific read buses 66 at a preset time. The write control unit 64 writes the result data from a functional unit 75 or the load-store unit 80 or the data cache 85 to the register file 60 on a specific write bus 68 at a preset time. The execution queue 70 is set to dispatch an instruction to a functional unit 75 or the load-store unit 80 at a preset time. In each case, the preset time is the time determined by the decode/issue unit 30. The preset time is a future time that is based on the time count, so when the time count counts up to the preset time, then the specified action will happen. The specified action can be reading data from the register file, writing data to the register file, issuing an instruction to a functional unit for execution, or some other action. The decode/issue unit 30 determines when an instruction is free of data dependencies and the resource is available. This allows it to set the "preset time" for the instruction to be executed in the execution pipeline. Note that with the exception of register renaming, all discussion related to the instructions of the processor 10 also applies to the vector instructions in the vector coprocessor 100.

In the microprocessor system 10, the instruction fetch unit 20 fetches the next instruction(s) from the instruction cache 24 to send to the instruction decode unit 30. The number of instructions per cycle can vary and is dependent on the number of instructions per cycle supported by the processor 10. For higher performance, microprocessor 10 fetches more instructions per clock cycle for the instruction decode unit 30. For low-power and embedded applications, microprocessor 10 might fetch only a single instruction per clock cycle for the instruction decode unit 30. A control and status register (VCSR) 131 for vector instructions is kept in the instruction decode unit 30. The instruction decode unit 30 can detect a control and status instruction to modify the controls or modes of operations for a subsequent vector instruction. The VCSR 131 may include grouping of vector registers, vector element length, vector register extension, and the total vector length. If the instructions are not in the instruction cache 24 (commonly referred to as an instruction cache miss), then the instruction fetch unit 20 sends a request to external memory (not shown) to fetch the required instructions. The external memory may consist of hierarchical memory subsystems, for example, an L2 cache, an L3 cache, read-only memory (ROM), dynamic random-access memory (DRAM), flash memory, or a disk drive. The external memory is accessible by both the instruction cache 24 and the data cache 85. The instruction fetch unit 20 is also coupled to the branch prediction unit 22 for prediction of the next instruction address when a branch is detected and predicted by the branch prediction unit 22. The instruction fetch unit 20, the instruction cache 24, and the branch prediction unit 22 are described here for completeness of a microprocessor 10. In other embodiments, other instruction fetch and branch prediction methods can be used to supply instructions to the instruction decode unit 30 for microprocessor 10.

The instruction decode unit 30 is coupled to the instruction fetch unit 20 for new instructions and also coupled to the register renaming unit 35 and the register scoreboard 40. The instruction decode unit 30 decodes the instructions for instruction type, instruction throughput and latency times, and the register operands. The register operands, for example, may consist of 2 source operands and 1 destination operand. The operands are referenced to registers in the register file 60. The source and destination registers are used here to represent the source and destination operands of the instruction. The source registers support solving read-after-write (RAW) data dependencies. If a later instruction has the same source register as the destination register of an earlier instruction, then the later instruction has RAW data dependency. The later instruction must wait for completion of the earlier instruction before it can start execution. The RAW data dependency is often referred to as true dependency and is applied to all types of instructions including vector instructions. The vector instructions may read and write to the register file 60 and are tracked by the register scoreboard 40 as part of the main pipeline of the processor 10.

Other data dependencies for the instructions include the write-after-write (WAW) and write-after-read (WAR). The WAW data dependency occurs when 2 instructions write back to the same destination register. The WAW dependency restricts the later instruction from writing back to the same destination register before the earlier instruction is written to it. To address the WAW dependency, in a given sequence of instructions, every destination register is renamed by the register renaming unit 35 where the later instruction is written to a different register from the earlier register, thus eliminating the WAW data dependency. For example, if three instructions have the same destination register R5, and which are renamed to R37, R68, R74 then the three instructions can write to the destination register at any time, which permits out-of-order execution for this sequence of instructions. Without renaming, all three instructions will try to write to the same register R5 which is a WAW dependency in that the third instruction cannot write to R5 before the second instruction, which cannot write to R5 before the first instruction. For the vector coprocessor 100, the vector register data width is typically quite large, i.e., 512 bits to several thousand bits, and adding temporary vector registers is very expensive in area, thus in the disclosed embodiment the vector registers are not renamed. For WAW data dependency, the second write to the same destination vector register must not happen before the first write is done. The vector instructions are sent from the instruction issue unit 55 to the vector instruction queue 120. When the vector instructions are validated by re-order buffer 45, they are sent to the vector issue and execution pipeline 125. The extended vector register file 260 is used to extend the data width of the vector register when the vector instructions are issued and executed by the vector functional unit. The vector data memory 280 is the local data memory to provide faster data access for large matrix as part of the matrix multiplication.

The register renaming unit 35 also eliminates the WAR data dependency where the later instruction cannot write to a register until the earlier instruction reads the same register. Since the destination register of the later instruction is renamed, the earlier instruction can read the register at any time. In such an embodiment, as the destination registers are renamed, the instructions are executed out-of-order and written back to the renamed destination register out-of-order. The register scoreboard 40 is used to keep track of the completion time of all destination registers. In a preferred embodiment the completion time is maintained in reference to the time count 90. Since register renaming is not used for vector registers, the read time of a source register must be tracked in the vector register scoreboard 140 so that the second vector instruction cannot write to the same register before the first instruction reads the data.

In one embodiment, the register renaming unit 35 consists of a register free list (RFL) 36, a register alias table (RAT) 37, and an architectural register table (ART) 38. The RAT 37 and the ART 38 include the integer registers as defined by the baseline instructions, the custom registers, the floating-point registers for the floating-point instructions, and any extension registers for any extended instructions. Disclosed herein is an implementation of the floating-point instructions as an extension to the baseline instructions for any or combination of different extension instruction types. In one embodiment, the baseline instructions are integer instructions with the 32-entry architectural registers and the floating-point instructions have 32-entry floating-point architectural registers, and 64 temporary registers for renaming, for a total of 128 physical registers, referred to as the register file 60. In one embodiment, the integer and floating-point registers are assumed to have the same data width. If the data width of floating-point registers is smaller than the data width of the integer registers, then the upper bits of the register file 60 are not used when the registers are the floating-point registers. The architectural registers are mapped into the physical register file 60 which the issue and execute pipelines of the microprocessor 10 use to execute instructions based on the registers in register file 60 without any reference to the integer or floating-point registers.

In the above-described embodiment, register scoreboard 40 keeps the write back time for the 128 physical registers. The register scoreboard 40 is associated with the physical register file 60. The RFL 36 keeps track of temporary registers (64 registers in this example) which have not been used. As the destination register of an instruction is renamed, a free-list register is used for renaming. The register alias table 37 stores the latest renamed registers of the architectural registers. For example, if register R5 is renamed to the temporary register R52, then the register alias table 37 keeps the renaming of R5 to R52. Thus, any source operand which references to R5 will see R52 instead of R5. As the architectural register R5 is renamed to R52, eventually when register R52 is retired, the architectural register R5 becomes R52 as stored in the ART 38. The RAT 37 keeps track of the architectural register renaming for both integer and floating-point registers which will eventually retire to the ART 38. The register scoreboard 40 indicates the earliest time for availability of a source register of the register file 60, independently of register type.

In one embodiment, if instructions are executed out-of-order, then the re-order buffer 45 is needed to ensure correct program execution. The register renaming 35 and the instruction decode unit 30 are coupled to the re-order buffer 45 to provide the order of issued instructions and the latest renaming of all architectural registers. The re-order buffer 45 is needed to retire the instructions in order regardless of when the instructions are executed and written back to the register file 60. In one embodiment, re-order buffer 45 takes the form of a first in first out (FIFO) buffer. Inputs are instructions from the decode unit 30 and instructions are retired in order after completion by the functional unit 75 or the load store unit 80. In particular, the re-order buffer 45 flushes all instructions after a branch misprediction or instruction exception. In one embodiment, the re-order buffer 45 retires the instructions that are executed in the main execution pipeline and commits the vector instructions that were sent to the vector instruction queue 120. The vector instruction queue 120 holds the vector instructions until they are committed by the re-order buffer 45, at which time the committed vector instructions can be scheduled for execution and writing back (retired) to the vector register file 160 in the vector issue and execution pipeline 125. The ART 38 is updated only with the instructions before a branch misprediction or instruction exception. Another function of the re-order buffer 45 is writing data to memory only in accordance with the order of the load and store execution. The data memory (including data cache 85 and external memory) should be written in order by retiring of the store instructions from the re-order buffer 45. Retiring of store instructions is performed in order for each thread, so the store buffer (not shown) in the load store unit 80 is duplicated for each thread.

Each of the units shown in the block diagram of FIG. 1 can be implemented in integrated circuit form by one of ordinary skill in the art in view of the present disclosure. With regard to one embodiment of this invention, time counter 90 is a basic N-bit wrap-around counter incrementing by 1 every clock cycle. The time-resource matrix 50 is preferably implemented as registers with entries read and written as with a conventional register structure.

The integrated circuitry employed to implement the units shown in the block diagram of FIG. 1 may be expressed in various forms including as a netlist which takes the form of a listing of the electronic components in a circuit and the list of nodes that each component is connected to. Such a netlist may be provided via an article of manufacture as described below.

In other embodiments, the units shown in the block diagram of FIG. 1 can be implemented as software representations, for example in a hardware description language (such as for example Verilog) that describes the functions performed by the units of FIG. 1 at a Register Transfer Level (RTL) type description. The software representations can be implemented employing computer-executable instructions, such as those included in program modules and/or code segments, being executed in a computing system on a target real or virtual processor. Generally, program modules and code segments include routines, programs, libraries, objects, classes, components, data structures, etc. that perform particular tasks or implement particular abstract data types. The program modules and/or code segments may be obtained from another computer system, such as via the Internet, by downloading the program modules from the other computer system for execution on one or more different computer systems. The functionality of the program modules and/or code segments may be combined or split between program modules/segments as desired in various embodiments. Computer-executable instructions for program modules and/or code segments may be executed within a local or distributed computing system. The computer-executable instructions, which may include data, instructions, and configuration parameters, may be provided via an article of manufacture including a tangible, non-transitory computer readable medium, which provides content that represents instructions that can be executed. A computer readable medium may also include a storage or database from which content can be downloaded. A computer readable medium may also include a device or product having content stored thereon at a time of sale or delivery. Thus, delivering a device with stored content, or offering content for download over a communication medium may be understood as providing an article of manufacture with such content described herein.

The aforementioned implementations of software executed on a general-purpose, or special purpose, computing system may take the form of a computer-implemented method for implementing a microprocessor, and also as a computer program product for implementing a microprocessor, where the computer program product is stored on a tangible, non-transitory computer readable storage medium and include instructions for causing the computer system to execute a method. The aforementioned program modules and/or code segments may be executed on suitable computing system to perform the functions disclosed herein. Such a computing system will typically include one or more processing units, memory and non-transitory storage to execute computer-executable instructions.

Figure 2:
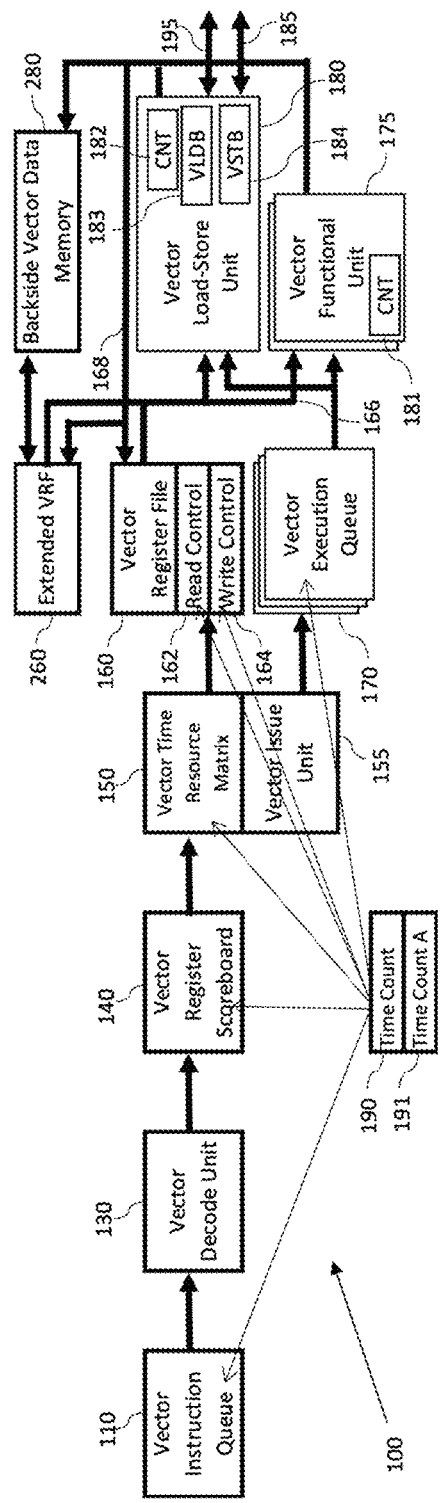
FIG. 2 is a block diagram illustrating further details of an embodiment of the vector co-processor of FIG. 1.

FIG. 2 illustrates a block diagram of a preferred embodiment of vector coprocessor 100. The modules in the vector coprocessor 100 are similar to the corresponding modules in the main pipeline of the microprocessor 10 and operate with the same principles. See, e.g., the descriptions in the patent applications referenced above as being incorporated by reference. For ease of understanding, the modules of the vector coprocessor 100 are numbered corresponding to the modules in the main pipeline of the microprocessor 10 by adding 100 to the reference number. The vector coprocessor 100 includes a vector instruction queue 120, a vector decode unit 130, a vector register scoreboard 140, a vector time-resource matrix 150, a vector issue unit 155, a vector register file 160, a read control unit 162, a write control unit 164, a plurality of vector execution queues 170, a plurality of vector functional units 175, a vector load-store unit 180, an extended vector register file 260, and a back-side vector data memory 280. The vector coprocessor 100 includes a plurality of read buses 166 connecting the vector register files 160 and the extended vector register files 260 to the vector functional units 175 and vector load-store unit 180. The vector coprocessor 100 also includes a plurality of write buses 168 to write result data from the vector functional units 175 and the vector load-store unit 180 to the vector register file 160 and the extended vector register files 260. The vector load-store unit 180 consists of multiple buses to the external memory through the bus 195 and the data cache 85 through the bus 185. The loaded data from the vector load-store unit 180 can also be written to the vector data memory 280 for future usage and avoiding loading of the same data again. The functionality of the modules in the vector coprocessor 110 is similar to those of the main pipeline of the microprocessor 10. Details of the operation of the vector modules correspond to details of the modules of the microprocessor 10. The vector register scoreboard 140 includes the read times of source registers which are a superset of the register scoreboard 40. In one embodiment, the vector coprocessor schedules instructions to be executed at a preset time based on a time count from a time counter. In such a vector coprocessor the vector instructions are scheduled to be executed using the known throughput and latency of each vector instruction to be executed. The time counter 190 can be the same as the microprocessor time counter 90 or can be an independent coprocessor time counter 190. The independent time counter 190 allows the time count to be frozen when result data do not return at the preset time.

When a vector instruction is issued from a vector execution queue 170 to a vector functional unit 175 or a vector load-store unit 180, the count block 181 or 182 is set with the execution latency time, respectively. The vector instruction is issued and expected to complete when the count block 181 or 182 is counted down to zero. The count blocks 181 and 182 are used when the time counter 190 is frozen which will be discussed later.

The data width of a vector register (VLEN) in the vector register file 160 can be the same as the data width of the vector functional unit 175 (DLEN). For example, a VLEN of 512-bit consists of 32 elements of 16-bit (ELEN) data and a DLEN of 512-bit can operate on all 32 elements at the same time. If the DLEN is 256-bit, then the vector functional unit 175 operates on 16 elements at a time and 1 more cycle (2 cycles in total) is needed to finish a vector instruction. The vector registers can be grouped (LMUL) together to increase the effective VLEN. For example, with a grouping of 8 vector registers (LMUL-8), the effective VLEN is 4096-bits and 8 cycles are needed to complete a vector add instruction with the DLEN=512-bit. When a vector instruction is issued from a vector execution queue 170 to a vector functional unit 175 or a vector load-store unit 180, the count block 181 or 182 is set with the execution latency time, respectively. The vector instruction is issued and expected to complete when the count block 177 or 182 is counted down to zero. The count blocks 177 and 182 are used when the time counter 190 is frozen which will be discussed later.

The vector load and store instructions are a special case because they are in both the main execution pipeline of the processor 10 and the vector coprocessor 110. The addresses of the vector load and store instructions use the registers from the register file 60 while the load and store data are referenced to the vector register file 160. The load/store address calculation is in the main pipeline of processor 10 where the address attributes and protection are performed by the load store unit 80. The load store unit 80 accepts speculative instructions, as with all the instructions in the main pipeline, where the load/store instruction can be flushed by a branch misprediction or an exception. The load and store instructions in the vector load store unit 180 are executed only after the commit point indicated by the re-order buffer 45. The vector load store unit 180 employs a vector load buffer (VLDB) 183 to keep the speculative load data which can be flushed if the vector load instruction is invalidated by the re-order buffer. The vector load store unit 180 also has a vector store buffer (VSTB) 184 to keep vector store data until it is written to the data cache 85 by the load store unit 80. In an embodiment, the vector data for the vector load and store instructions are provided from the external memory through the bus 195. The external memory may be specialized as local memory unit dedicated to the vector coprocessor 100. The vector load store unit 180 may consist of another set of vector load and store buffers, i.e., multiple sets of vector load buffer 183 and vector store buffer 184, for data from the external memory. The load store unit 80 and the vector load store unit 180 can operate asynchronously from each other. The vector load and store buffers are used to synchronize data between the load store units based on the valid vector data in the buffers.

Figure 3:
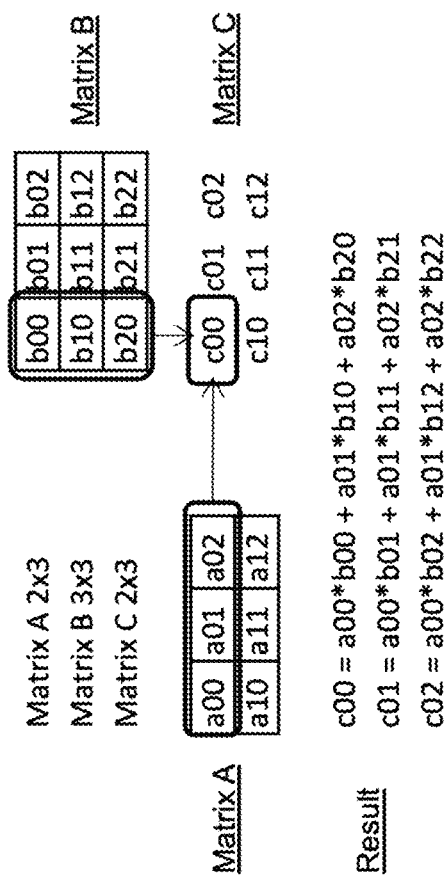
FIG. 3 is an example of matrix multiplication.

Matrix multiplication is used by way of example to illustrate extending the data width of the vector registers. Extending of the data width of the vector registers does not limit the type of application. Matrix multiplication is shown in FIG. 3 illustrating multiplying matrix A(2×3) with matrix B(3×3) to produce matrix C(2×3). The number of elements in a row of matrix A is the same as the number of elements in a column of matrix B which are multiplied and accumulated to form an element in matrix C. The first element of matrix A, a00, is multiplied to the first row of matrix B which is shown in the Result as the first multiplication for the C elements. The second element of matrix A, a01 is multiplied to the second row of matrix B which is shown in the Result as the second multiplication for the C elements. The first and second multiplications in the formula for C elements are added by using the multiply-accumulate (MAC) functional unit which is one of the plurality of vector functional units 175. The third element of matrix A, a02, is multiplied to the third row of matrix B and accumulated with previous multiplication using the MAC functional unit 175 to form the first row of elements (c00= . . . ) for matrix C. The process is repeated again for the second row of matrix A to multiply to the rows of matrix B to form the second row of elements for matrix C (c01= . . . ). Note that the elements can be integer or floating-point numbers where the integer MAC or floating-point MAC functional unit are used, respectively. In real application, the matrices are much larger, for example, the number of rows for matrix A can be 512 elements and the number of rows for matrix B can be 1024 elements. The first row of elements for matrix C requires 512 MAC operation of 1024 elements which is 524,288 operations. For a VLEN and DLEN of 512-bits or 32 elements, the number of cycles needed for the MAC operations is 16,384 cycles. The vector extension 260 in one embodiment can extend the VLEN and DLEN by 4 times, effectively reducing the number of operation cycles to 4,096. The register grouping of 8 (LMUL=8) creates an effective VLEN of 1024 elements, and 512 vector instructions are needed to produce the first row of matrix C.

In one embodiment, the vector coprocessor 100 is designed with VLEN=DLEN in accordance with the vector instruction set architecture. The extended vector register file (VRF) 260 is designed to extend the VLEN of the vector registers of the vector register file (VRF) 160, such that the modified VLEN can be a multiple of the architected VLEN. In other words, the VRF 260 operates to extend the physical width of the VLEN. The extended VRF is a custom extension of the VRF which can have many options: (1) the extension can be for a subset of the VRF, i.e., extending the VLEN for only 16 or 24 vector registers instead of all 32 vector registers, and the number of extended vector registers are programmable, (2) the extension can be programmable to extend the VLEN to a different data width depending on the operation, (3) only a subset of vector instructions from the vector instruction set architecture can be implemented for the extended VLEN, i.e., the permute and divide instructions are not implemented for the extended VLEN, or alternatively, the extended VRF 260 can be configured to not used for the permute instructions. The extended VRF 260 can be enabled by different methods as illustrated in FIG. 4A and FIG. 4B, such as: (1) a mode bit in a control and status register (CSR) for vector instructions 131 can be set so that subsequent vector instructions use the modified VLEN. This technique has the advantage that the compiler can change to modified VLEN, (2) the VLEN is specified in a set of custom instructions, i.e., four different vector add instructions for 4 different VLENs. In FIG. 4A, the instruction setvli writes to the VCSR register 131 to change the modes for the subsequent vector instructions, the element length is set for 16-bit, the register grouping is set for 8 registers, and the VRF extension is enabled for subsequent vector instructions. The subsequent vector instructions have the effective VLEN and DLEN of 128 elements and the register grouping of 8 (LMUL=8) for 1024 elements as shown in the next 3 vector instructions. The second setvli instruction disables the VRF extension in which case subsequent vector instructions are back to the VLEN and DLEN of 32 elements. Note that the VRF extension is effective for only a group of vector instructions in which vector functional units and/or instruction types can use the modified VLEN, other vector instructions use the architecture VLEN. In one embodiment, the VRF extension mode can be more than 1 bit to enable 2×, 4×, or 8× the VLEN of the VRF 160. In FIG. 4B, custom instructions are added for the vector instructions in which the field ce4 is added to the vector instruction to indicate 4× the VLEN and DLEN. Note that custom instructions for 2× and 8× can also be implemented.

Figure 5A:
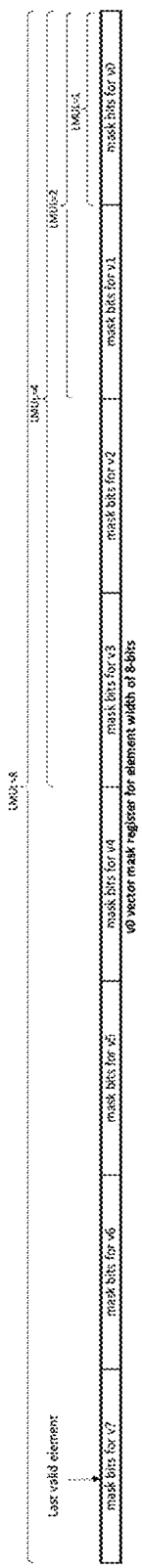
FIG. 5A, FIG. 5B, FIG. 5C and FIG. 5D illustrate examples of 8, 16, 32, and 64-bit element masks of a vector register.
Figure 5B:
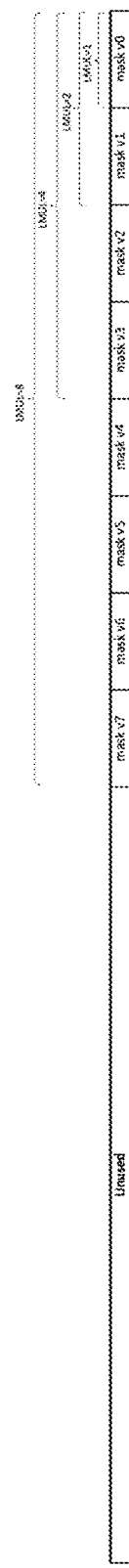
Figure 5C:
Figure 5D:
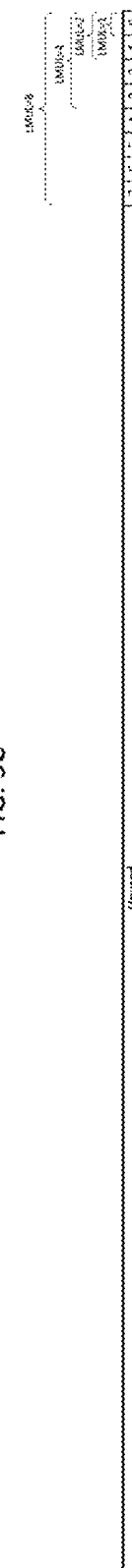

In one embodiment, each element in the vector register can be masked and the vector register v0 is used as the mask as shown in FIGS. 5A-D. In this example, the VLEN is 512 bits in which 8, 8-bit elements are used (64 bits) for LMUL=1, or 128 bits for LMUL=2, or 256 bits for LMUL=4, or 512 bits for LMUL=8. When the register grouping is 8 (LMUL=8), then all bits of vector register v0 are used for the mask as shown in FIG. 5A. When LMUL is 1, then only 64 bits are used for masking of 64 elements. For element width of 16-bits, as shown in FIG. 5B, only half of the vector register v0 is used for masking. Similarly, FIG. 5C and FIG. 5D show the mask bits for 32-bit and 64-bit elements, respectively. Individual elements of a vector register can be masked by setting or clearing of the corresponding bits in the vector register v0. In another embodiment, an independent mask register can be used instead of the vector register v0. In most cases, the mask register is used to specify the number of valid elements of a matrix, for example, the number of valid elements may be 0 to 448 out of the effective total elements of 512 as shown as the last valid element in FIG. 5A. For the extended VRF, the vector register v0 is included in the extended VRF for masking of the extended vector registers or a CSR can be used to indicate the vector length of the effective VLEN. The vector mask or vector length is part of the CSR register 131 and setvli instruction. The mask is set for all elements of vector register grouping. The last valid element sets the valid elements from element 0 to the last valid element, and masks for all elements from the element after the last element to the end of the effective vector register.

Figure 6:
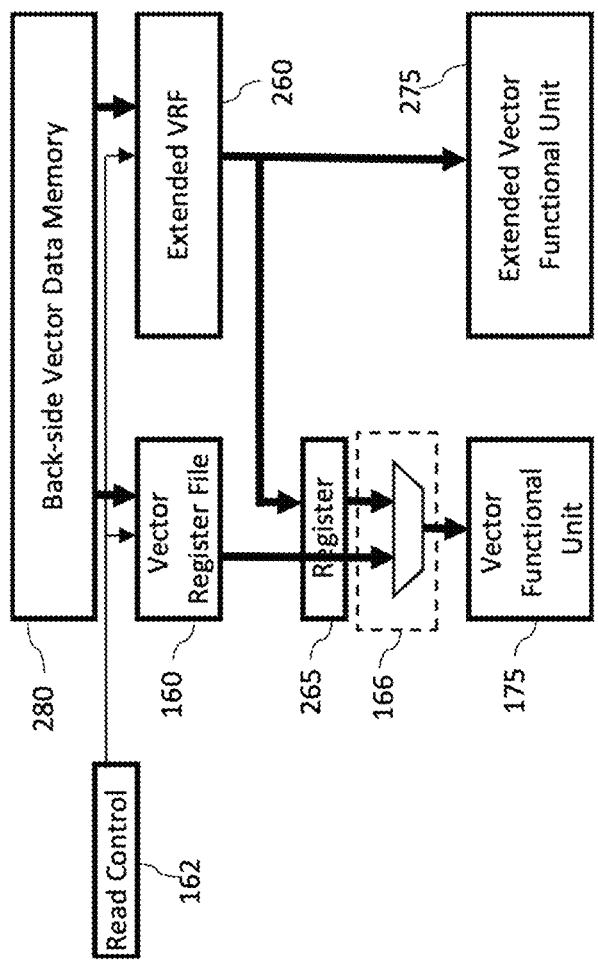
FIG. 6 is a block diagram illustrating an embodiment of an extended vector register file, a vector register file and a vector functional unit.

FIG. 6 illustrates the operation of a vector instruction with extended VRF 260. In the normal operation of VRF 160, the read control unit 162 is coupled to the VRF 160 to send a request to read a vector register, the selected vector register is read from the VRF 160 and sent on read bus 166 to the vector functional unit 175 for execution. This is the same operation with the extended VRF 260 where the first vector operation by the vector functional unit 175 is from the VRF 160. With use of the extended VRF 260, the read control unit 162 is also coupled to the extended VRF 260 to send a request to read the same vector register, the selected vector register is read from the extended VRF 260 and sent to a pipeline register 265. The vector data from the extended VRF 260 is delayed by 1 clock cycle by the pipeline register 265 to the vector functional unit 175 to be executed in the next cycle. The extended VRF 260 is not in the critical data path of the VRF 160 and the vector functional units 175. The extended VRF 260 has minimal impact on the timing of the architected vector coprocessor 100 with the benefits of increasing the performance and reducing the number of vector instructions executed by increasing the VLEN. In one embodiment, extended vector functional unit 275 is added to execute data from the extended VRF 260 in parallel with the vector functional unit 175.

In an embodiment, the back-side vector data memory 280 is used to keep data that are written into the vector register file 160 and the extended vector register file 260. The data width of an entry in the vector data memory 280 is the same as VLEN+XVLEN of the vector register and extended vector register. For example, if the modified VLEN is 256 bytes with register grouping of 8, then the data width of an entry in the vector data memory 280 is 2048 bytes. By way of example, a vector data memory 280 of 1 MB has 512 entries of 2 KB. With smaller vector data memory, for example 256 KB, the matrix can be sliced into 4 smaller matrices which will take more iterations of the loop but the performance of the inner matrix will remain the same. Since the addresses of the matrix elements are consecutive, accessing the data vector memory can take more than 1 cycle but interleaving with multi banks is possible to fetch data in single cycle. The storage of data from combining of vector load instructions is similar to a direct memory access (DMA). The full address for each entry may be in storage but only the offset portion is used for reading data if the address of the second entry is consecutive to the first entry. The vector data memory 280 can have many configurations from the total size, the data width of the entries, the storage address for each entry, the number of banks to allow reading and writing of multiple accesses. The vector data memory 280 is configured to read a data width of VLEN-XVLEN at a time to write to the vector register and extended vector register in a single clock cycle. The vector data memory 280 can be programmed in a control and status register, such as VCSR 131, to utilize when a certain instruction type is decoded and the mode bit for extended VRF 260 is set.

Figure 7:
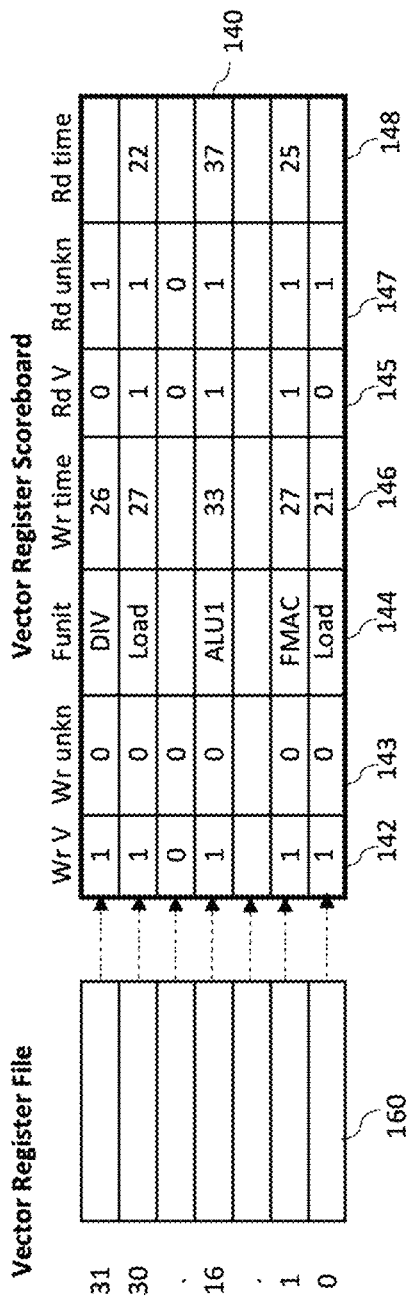
FIG. 7 is a block diagram illustrating an embodiment of a vector register file and a register scoreboard.

FIG. 7 illustrates further details of the vector register file 160 and the vector register scoreboard 140. In one embodiment, the vector register file 160 has 32 registers which are architectural vector registers without any temporary register, numbered as registers 0 to 31 as illustrated. Each register in the vector register file 160 has a corresponding entry in the vector register scoreboard 140. The vector register scoreboard 140 stores the pending read and write statuses for the registers 160. A valid bit field 142 indicates a valid write back to the vector register file 160 at a future time in reference to the time count 90, as specified by the write time field 146 from a specific functional unit in the "Funit" field 144. If the write time is not known due to the uncertainty of the contents of the data cache 85, then the write unknown bit 143 is set. In an embodiment, the vector instruction is stalled in vector decode unit 130 if the unknown bit 143 is set for the source register or the destination register of the vector instruction. As examples, illustrated in FIG. 7, register 0 is written back at time count 21 from the vector load-store unit 180. Register 1 is written back at time count 27 from the floating-point multiply-accumulate unit (one of the vector functional units 175). Register 16 is written back at time count 33 from the ALU1, (another of the vector functional units 175), etc. The write time 146 is the time in reference to the time count 190. The write time 146 is based on when the data is written back to the vector register file 160 and not the extended VRF 260. Except for the divide functional unit, the throughput of all operations of the vector functional unit 175 is a single cycle. The write time 146 is used by the next vector instruction to start execution and the data from the extended VRF are not needed until a cycle later as shown in FIG. 6. In one embodiment, to simplify the design, the vector divide instruction is excluded from the extended VRF 260. The result data is written to the vector register file 160. The data is not available from the vector register file 160 until the next clock cycle, but the result data can be forwarded from the corresponding functional unit 144 in the vector register scoreboard 140. For example, if the value of the time count 190 is 19, then the vector load-store unit 180 produces the result data in 2 clock cycles at time count 21 for writing back to the vector register file 160. In one embodiment, the "Funit" field 144 is 5 bits which accommodate 32 different vector functional units 175 and vector load/store unit 180. The number of bits for "Funit" field 144 is configurable in any given design for addition of a predetermined number of baseline, custom, and extended vector functional units.

The write back time from a vector functional unit 175 is based on the known latency time of an instruction. The latency time of a load instruction is not fixed. The latency time of a load instruction can be unpredictable as the load data may not be in the data cache 85. For a data cache miss, the data must be fetched from external memory as described above. In such a situation, the write back time in the scoreboard 140 for the destination register of a vector load instruction will no longer be correct. If processor 10 is implemented with a level 2 cache (not shown), then the latency time for a level 2 cache hit can be used to update the vector register scoreboard 140. In one embodiment, the vector load-store unit 180 has load data buffers to receive data from the external memory through the bus 195 and to receive data from the data cache 85 before writing load data to the vector register file 160. In another embodiment, the external memory is a local vector memory (not shown) which has deterministic latency time to be used as the write time for the register scoreboard 140. Another set of load and store buffers are implemented in the vector load store unit 180 for interfacing with the external memory.

In FIG. 7, the vector register scoreboard 140 includes a valid bit field 145 to indicate a valid read of the vector register file 160 at a future time in reference to the time count 190, as specified by the read time field 148. If the read time is not known due to the uncertainly of the data cache 85, then the read unknown bit 147 is set. In an embodiment, the vector instruction is stalled in vector decode unit 130 if the unknown bit 147 is set for the destination register of the vector instruction. As examples, illustrated in FIG. 7, register 1 is read at time count 25. Register 16 is read at time count 37 and register 30 is read at time count 22. The read time 148 is the time in reference to the time count 190. The source data is read from the vector register file 160 to be used by a vector functional unit 175 in the next cycle.

The read time is the preset time to read data from the vector register file 160. The read data from the vector register file 160 is synchronized with the vector execution queue 170 to send a vector instruction to a vector functional unit 175 or to write to a store buffer 184 in the vector load store unit 180 in the cycle in which the data from the vector register file 160 is available. The store buffer 184 in the vector load-store unit 180 can be full which will cause the read time to be unknown where the read unknown bit 147 of the register scoreboard 140 is set. In another embodiment, the vector store instruction is issued only if the store buffer 184 in the vector load-store unit 180 has available entries for vector store data. In this case, the read time for the vector store data is always known.

The write time of a destination register is the read time for the subsequent instruction with RAW data dependency on the same destination register. Referring back to FIG. 2 the vector decode unit 130 accesses the vector register scoreboard 140 for the read times of source registers in a vector instruction. If the valid bit 142 of a source register is not set in the register scoreboard 140, then the data in the vector register file 160 can be accessed at any time providing availability of the read buses 166, otherwise the write time 146 is the earliest time to read the source operand data. In one embodiment, if the write unknown bit 143 is set, then the vector instruction is stalled in the vector decode unit 130 until the unknown bit 143 is reset. The write time 146 is when the result data from the vector functional unit 175 or the vector load store unit 180 are on the write bus 168 to the vector register file 160. The result data from write bus 168 can be forwarded to read bus 166 so that the result data is available on the read bus 166 in the same clock cycle in which it is written to the vector register file 160. In one embodiment, the "Funit" field 144 indicates which functional unit will write back to the vector register file 160, and the designated functional unit can restrict the aforementioned forwarding to the read bus 166 due to the presence of a critical timing path. For example, the data from the data cache is a critical timing path in which case forwarding is performed, in one embodiment, to only the ALUs. If the issued instruction is multiply, then the write time 146 from vector load store unit 180 should be incremented by 1 to be used as the read time for the multiply instruction. In such an instance, the multiply instruction reads the data from the vector register file 160 one cycle after the load data is written to the vector register file 160. Forwarding of data from the data cache 85 to the ALU is normal and is the same as forwarding of any functional unit to any functional unit, while forwarding of data from data cache 85 to multiply unit is not allowed. As an example, when the ALU instruction reads the register 0 of the vector register scoreboard 140 in FIG. 7, the write time 146 of 21 is used as the read time as data can be forwarded from the data cache 85 onto read bus 166. When the multiply instruction reads the same register 0 of the vector register scoreboard 140 in FIG. 7, the read time of 22 is used to read data from the vector register file 160 as the data from data cache 85 are written into the vector register file 160 in cycle 21. This same restriction is kept and does not permit the read control unit 162 to forward the load data from the data cache 85 to the multiply unit.

Because there is no register renaming in the vector coprocessor 100, the processor must also handle WAW and WAR data dependency. The read time described in the previous paragraph is used to calculate the write time of the vector instruction based on the latency time of the vector instruction. The destination register of the vector instruction is used to access the vector register scoreboard 140 for the valid write time 146 (write valid bit 142 is set) and the valid read time 148 (read valid bit 145 is set) which must be less than the calculated write time of the vector instruction. If either the write time 146 or the read time 148 is greater than the calculated write time, then the read time is adjusted to avoid the WAW and WAR data dependency. In one embodiment, if the write unknown bit 143 or the read unknown bit 147 is set, then the vector instruction is stalled in the vector decode unit 130.

An instruction reads source operand data at read time, executes the instruction with a vector functional unit 175 at execute time, and writes the result data back to the vector register file 160 at write time. The write time is recorded in the write time field 146 of the vector register scoreboard 140. With 2 source registers, a given instruction selects the later write time, of the two source registers, from the vector register scoreboard 140 as the read time for the instruction. The read time is further adjusted by the WAW or WAR data dependency if the write time 146 or the read time 148 of the destination register of the vector instruction is equal or greater than the calculated write time. The execute time is the read time plus 1 where the vector functional unit 175 or the vector load-store unit 180 starts executing the vector instruction. The write time of the instruction is the read time plus the instruction latency time. If the instruction latency time is 1 (e.g., a vector ALU instruction), then the write time and execution time of the vector instruction are the same.

As noted above, each instruction has an execution latency time. For example, the add instruction has a latency time of 1, the multiply instruction has a latency time of 2, and the load instruction has a latency time of 3 assuming a data cache hit. In another example, if the current time count is 5 and the source registers of a vector add instruction receive write time counts from a prior instruction of 22 and 24 from the vector register scoreboard 140, then the read time count is set at 24. In this case, the execution and the write time counts are both 25 for the vector add instruction. As shown in FIG. 2, the vector register scoreboard 140 is coupled to the vector time-resource matrix 150 where the read, execute, and write times of an instruction access the vector time-resource matrix 150 to determine availability of the resources.

FIG. 8 illustrates further details of the vector time-resource matrix 150 which preferably includes the same number of time entries to match the time counter 190. For example, if the time counter 190 has 64 cycles, then the vector time-resource matrix 150 has 64 entries. In one embodiment, the time counter is incremented every clock cycle and rotates back from the 63$^{rd}$ entry to the 0$^{th}$ entry. The columns in the vector time-resource matrix 150 represent the available resources for the read buses 151, the write buses 152, the vector ALUs 153, the vector load-store ports 156, the vector multiply unit 157, and the vector divide unit 158. If other custom or vector functional units are provided by vector coprocessor 100 those are also included in the resource matrix 150. The time-resource matrix 150 may consist of additional resources (not shown) such as dedicated read buses, write buses, and functional units for replaying of vector instructions.

The read buses column 151 corresponds to the plurality of read buses 166 in FIG. 2. The write buses column 152 corresponds to the plurality of write buses 168 in FIG. 2. The vector ALUs column 153, the vector multiply column 157, and the vector divide column 158 correspond to the plurality of vector functional units 175 of FIG. 2. The load-port ports column 156 corresponds to the load-store unit 180 of FIG. 2.

FIG. 8 also shows an example of the information in the vector time-resource matrix 150. Shown is data with a read time count of 24, an execution time count of 25, and a write time count of 25. When an instruction accesses the vector time-resource matrix 150 for availability of resources, the matrix 150 shows that at read time 24, 1 read bus is busy (151), at execution time 25, 2 vector ALUs (153), 1 load-store port (156), and 1 vector multiply unit (157) are taken for execution of previous vector instructions, and at write time 25, 2 write buses are busy (152). In one embodiment, the numbers of read buses, write buses, vector ALUs, load/store ports, vector multiply unit, and vector divide unit are 4, 4, 3, 2, 1, and 1, respectively. If a vector add instruction with 2 source registers and 1 destination register is issued with read time of 24, execution time of 25, and write time of 25, then the number of read buses 151 at time 24, write buses 152 at time 25, and vector ALUs 153 at time 25 are incremented to 3, 3, and 3, respectively. The source registers of the add instruction will receive data from read buses 2 and 3, vector ALU 3 is used for execution of the add instruction and write bus 3 is used to write back data from vector ALU 3. The counts in the row are reset by the time count. As illustrated in FIG. 8, when the time count is incremented from 14 to 15, all resource counts of row 14 are reset. All resource counts of row 15 are reset when the count is incremented to 16 in next cycle. In the embodiment of FIG. 8 resources are assigned to the issued instruction in-order of the resource count. If an issued instruction is a multiply instruction with execution time of 25, since there is only one multiply unit 157, the issued instruction cannot be issued for execution time of 25. In another embodiment, two read times, two execution times, and two write times are used per instruction with expectation that one set of times is free of conflict, increasing the chance for instruction issuing. In another embodiment, the counts indicate the number of available resources. The resource counts are decremented if the resource is assigned to an issue instruction.

In an embodiment, with the extended VRF 260, the modified VLEN is a multiple of the architected VLEN where an issued vector instruction means multiple cycles of execution by the functional unit 175. The read buses 151, the write buses 152, and the vector functional units 153, 156, and 157 are set for multiple cycles according to the modified VLEN.

All available resources for a required time are read from the vector time-resource matrix 150 and sent to the vector issue unit 155 for a decision of when to issue an instruction to the vector execution queue 170. If the resources are available at the required times, then the instruction can be scheduled and sent to the vector execution queue 170. The issued instruction updates the vector register scoreboard 140 with the write time and updates the vector time-resource matrix 150 to correspondingly reduce the available resource values. All resources must be available at the required time counts for the instruction to be dispatched to the vector execution queue 170. If all resources are not available, then the required time counts are incremented by one, and the time-resource matrix is checked as soon as the same cycle or next cycle. The particular number of read buses 166, write buses 168, and vector functional units 175 in FIG. 2 is preferably chosen to minimize stalling of instructions in the vector issue unit 155.

FIG. 9A illustrates a single read bus of the read control unit 162 and FIG. 9B illustrates a single write bus of the write control unit 164. The read control unit 162 and the write control unit 164 include a number of time entries to match the time counter 190. As mentioned above, in a preferred embodiment the time count is incremented every clock cycle. The columns in the read control unit 162 represent the source register 161 and a valid bit 163. The columns in the write control unit 164 represent the destination register 65 and a valid bit 67 in the write bus 168.

In the example illustrated in FIG. 9A, at the time count of 25 in the read control unit 162 the register R5 from the register field 161 of the read control 162 is used to read the entry 5 from the vector register scoreboard 140 for the "Wr time" 146 and the "Funit" 144. If the write time 146 is the same as the time count 190, then the result data is written back to the vector register file 160 in the same clock cycle. The result data from the "Funit" 144 can be forwarded to the read bus 166 instead of being read from the vector register file 160. In the next cycle, when the time count is 26, the register R27 from the register field 161 is used to read from the vector register file 160. The read control unit 162 is responsible for supplying the source operand data on a specific one of the read buses 166. The vector execution queue 170 keeps the information of which one of the read buses 166 is to receive source operand data. The vector execution queue 170 and read control unit 162 are synchronized based on the vector time-resource matrix 150. The read control unit 162 provides centralized control for the read buses 166, thus reducing complexity from the hundreds of instructions in dynamic scheduling architectures. The write time 146 of the register scoreboard 140 for register R5 may have been changed, in which case, the write time 146 is greater than the time count 190. The vector instruction is replayed by checking for the available replay resources (not shown) in the time-resource matrix 150 and the vector instruction remains in the execution queue 170 with the modified execution start time. For a vector load instruction with L2 data cache miss, the latency time may be unknown and the write unknown bit 143 of the register scoreboard 140 is set. In the example, if the unknown bit 143 for register R5 is set, then the vector instruction remains in the execution queue 170 with the modified execution start time using a default external fetch time. In an alternative embodiment, the write time 146 of the register R5 is set to the current time count 190 in order for the subsequent dependent instruction to be issued at the current time count 190. If the result data is not written back at the preset time 146, then the time count 190 is frozen until the result data is valid to write back to the vector register file 160. For example, a vector load instruction supposes to write back result data to R30 at time 27 as shown in column 146 of the vector register scoreboard 140 (FIG. 7) and as shown in FIG. 9B at time 27 of the write control 164 FIG. 9. The data cache miss for the vector load instruction in the vector load-store unit 180 is known at time 26 and accesses the time count 190 to freeze the time count at time 27. When valid result data is received by the load-store unit 180 from external memory, the load-store unit 180 unfreezes the time count 190 which will allow the write control 164 and the register scoreboard 140 to resume writing data from load-store unit 180 to the vector register file 160. Any functional unit which can delay the result data accesses the time count 190 to freeze the time count. The write time 146 of the register scoreboard 140 is not modified because of delay of the result data from the load operation but the time count 190 is frozen until valid data is returned from the load operation. In the above example of the read control unit 162 accessing register R5 of the vector register scoreboard 140, the time count 190 may be frozen until valid data are returned for R5. In this alternative embodiment, the "Wr unkn" 143 and "Rd unkn" 147 fields are not needed, and the "Wr time" 146 and "Rd time" 147 fields are not modified.

In FIG. 9A, at the time count of 25 in the read control unit 162, the register R5 from the register field 161 of the read control 162 is used to read the entry 5 from the vector register scoreboard 140 for the "Rd time" 148. If the read time 148 is the same as the time count 190 the read valid bit 145 is reset. The read of the register R5 is done. If the read time 148 is greater than the time count 190, then the read time 148 is for the later instruction. In the embodiment with frozen time count 190, at the time count 190, the vector data should be read from the vector register file 160 for the vector register 161 of the read control unit 162. If reading of vector data from the vector register file 160 is delayed. i.e., the vector store buffer 184 is full and cannot accept vector store data, then the time count 190 is frozen until the vector store buffer 184 can accept read vector data from the vector register file 160.

Similarly in FIG. 9B, the register R5 from the register field 165 of the write control unit 164 at time count of 26 is used to write to the vector register file 160. The register R5 will also access the "Funit" 144 of the vector register scoreboard 140 to get the result data from a specific vector functional unit 175. Again, the vector execution queue 170, the vector functional units 175, and the write control unit 164 are synchronized to transfer result data on a write bus 168 to write to the vector register file 160. In one embodiment, the valid (valid bit field 167) register 165 of write control unit 164 is responsible to clear the valid bit 142 from the vector register scoreboard 140 of FIG. 7. The write control unit 164 operates as a centralized control for the write buses 168 which removes complexity compared to distributing such control among the plurality of functional units in dynamic scheduling. In the embodiment with frozen time count 190, at the time count 26, the result data should be written back to the vector register file 160 for the vector register 165 of the write control unit 164. If the result data is delayed. i.e., data cache miss for the load instruction, then the time count 190 is frozen until the vector load data are valid from external memory.

The read control unit 162 and write control unit 164 are set based only on the VRF 160 as the same read and write vector registers are sent to both the VRF 160 and extended VRF 260 at the same time. The data from the extended VRF 260 are pipelined to the vector functional unit 175 in subsequent cycles. The result data from the vector functional unit are expected to be produced by in subsequent cycles.

Figure 10:
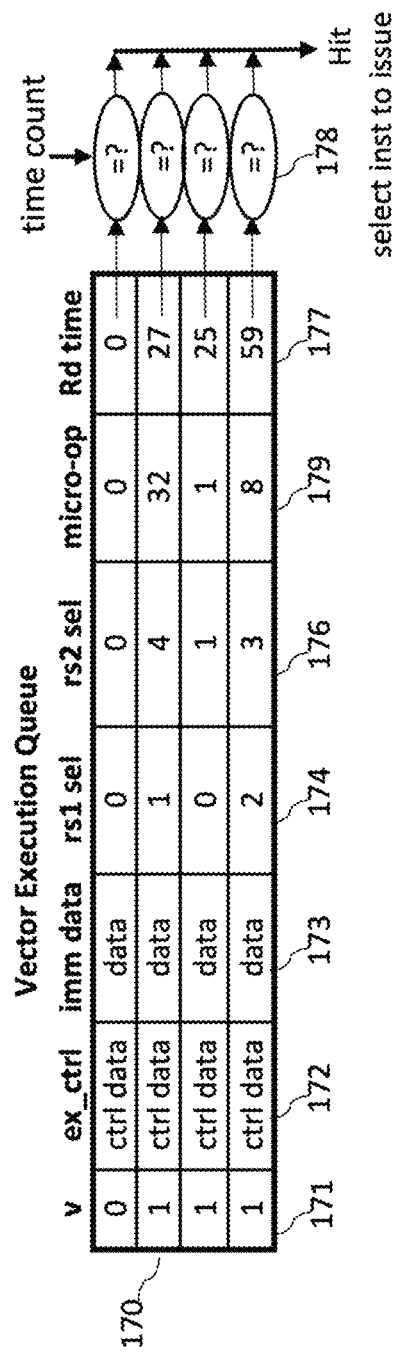
FIG. 10 is a block diagram illustrating an example of operation of an execution queue.

FIG. 10 illustrates an example of a 4-entry vector execution queue 170. The number of entries for the vector execution queue 170 is only an illustration. The invention is not limited to any number of vector execution queue 170 entries and the vector execution queue 170 could also take the form of a single-entry execution queue. Each entry represents an instruction waiting for execution by one of the vector functional units 175 or the vector load/store unit 180 according to the time count in the read time column 177. Each entry in the vector execution queue 170 preferably consists of the following fields: the valid bit 171, control data 172, the immediate data 173, the first source register select 174, the second source register select 176, the micro-operations 179, and the read time 177. The valid bit 171, when set to "1," indicates that the entry is valid in the execution queue 170. The control data 172 specifies the specific operation to be used by the vector functional units 175 or the vector load/store unit 180. The immediate data 173 is an alternative to the second source register for the instruction. The valid indication for the immediate data 173 may be included in the control data field 172. Most instructions have an option to use immediate data 173 instead of data from the second source register. The first source register select 174 identifies which one of the read buses 166 has the operand data for the first source register. The second source register select 176 identifies which one of the read buses 166 has the operand data for the second source register. The source register selects 174 and 176 may not be used for some instructions.

The read control 162 reads the vector register scoreboard 140 to ensure that the expected source operand data is still valid and is synchronized with the vector execution queue 170 to supply source data to the vector functional unit 175.

Note that the destination register can be, but does not need to be, kept with the instruction. The write control unit 164 is responsible for directing the result data from a vector functional unit 175 to a write bus 168 to write to the vector register file 160. The vector execution queues 170 are only responsible for sending instructions to the vector functional units 175 or the vector load-store unit 180. The read time field 177 which has the read time of the instruction is synchronized with the read control unit 162. When the read time 177 is the same as the time count 190 as detected by the comparators 178, the instruction is issued to the vector functional units 175 or the vector load/store unit 180. For the example in FIG. 10, the entries are issued to the functional units out-of-order. The read time field 177 indicates that the second entry is issued at time count 25, the third entry is issued at time count 27, and the first entry is issued at time count 32.

In an embodiment, each functional unit 175 has its own execution queue 170. In another embodiment, an execution queue 170 dispatches instructions to multiple functional units 175. In this case, another field (not shown) can be added to the execution queue 170 to indicate the functional unit number for dispatching of instructions. In one embodiment, the execution queue 170 is configurable with a single functional unit, or multiple different functional units, or multiple functional units of the same type such as vector ALU type for multiple vector ALUs or floating-point type for all floating-point vector functional units.

In the embodiment with the frozen time count 190, the time count 190 is frozen until the vector result data are valid or vector read data are accepted by the functional units. When an instruction is dispatched from the vector execution queue 170 to the vector functional unit 175 or the load-store unit 180, the execution latency time of the instruction is set in the latency counter 181 or 182, respectively. The instruction completes execution and writes back to the vector register file 160 when the latency counter counts down to zero. The latency counters 181 and 182 match with the write control 164 for writing back data to the vector register file 160. For example, at time count of 26, a multiply instruction with 4-cycle execution latency is dispatched to the multiply functional unit 175, then one of the write ports is valid to write back result data from the multiply functional unit 175 at time 30 and the latency counter 181 is set with 4 and counts down in 4 clock cycles to zero. Some vector instructions may be dispatched to the vector functional units 175 or the vector load-store unit 180 before the time count 190 is frozen. For example, at time count of 27, the time count 190 is frozen because the result data of the load-store unit 180 are delayed and the result data of the vector multiply functional unit 175 is still valid for writing back at time 30 to the vector register file 160. The vector functional units 175 and the vector load-store unit 180 will produce result data at the preset time even though the time count 190 is frozen. An alternative time count (Time Count A) 191 in FIG. 2 is used to continue counting as the time count 190 is frozen at time 27. The count blocks 181 and 182 of the vector functional unit 175 and the vector load-store unit 180, respectively, indicate valid pending execution of vector instructions beyond the frozen time count 190. The alternative time count 191 continues to increment until the count blocks 181 and 182 count down to zero. In this example, the alternative time count 191 is at 30 when the count block 181 is at zero and the vector multiply result data are written back to the vector register file 160. It is noted that the time count 190 may start counting again before the count blocks 181 and 182 are at zero. For example, the time count 190 starts counting again 1 cycle later at which time the time count 190 is 28 and the alternative time counter 191 is 29. The time count 190 can be frozen again at time 28 due to another delay of another result data, with a second vector instruction being dispatched at time 27 with pending execution in a second vector functional unit 175 and writing back to the vector register file 160. The count blocks 181 and 182 may include more than one timer and in this case, a second set of count blocks in 181 and 182 is available and used when the time count 190 is restarted and if the time count 190 is frozen again before the first set of count blocks 181 and 182 are zeros, then the second alternative time count 191 is used for writing back data from the vector functional units 175 and the vector load-store unit 182 based on the second set of the count blocks 181 and 182. As seen, the count blocks 181 and 182 permit continued execution of one or more instructions by a respective functional unit during freeze of the counter 190 and operate to stop counting of the alternative time counter 191. The alternative time count 191 is set to the value of time count 190 and starts counting when the time count 190 is frozen and one of the count blocks 181 or 182 is not zero. When the count blocks 181 and 182 are zero, then alternative time count 191 stops counting and is not used. In one embodiment, the count blocks 181 and 182 are in the vector functional units 175 and the vector load-store unit 182 should match with the "Funit" field 144 of the vector register scoreboard 140. The alternative time count 191 is selected by the non-zero count blocks 181 and 182 and is used by the write control unit 164 and the vector register scoreboard 140 for writing back data from the vector functional units 175 and the vector load-store unit 182.

Referring back to FIG. 2, the vector execution queues 170 are coupled to the vector load store unit (VLSU) 180 and the vector functional units 175. The vector execution queue 170 issues the instructions to the vector functional units 175 or the vector load/store unit 180 when the read times 77 are the same as the time count 190. If the instruction is a vector load/store, then it is dispatched to the VLSU 180, else it is dispatched to one of the vector functional units 175. The VLSU 180 and vector functional units 175 are also coupled to the read buses 166 and write buses 168 to access the vector register file 160. The source operand data are fetched from vector register file 160 and transported on read buses 166 to the VLSU 180 and vector functional units 175. The result data from the VLSU 180 and vector functional units 175 are transported on write buses 168 to write to destination registers in the vector register file 160. The VLSU 180 is also coupled to the data cache 85 for load and store data through the vector load and store buffers 183 and 184 in the VLSU 180. Typically, the vector functional units 175 perform different operations, e.g., ALU, multiply, divide, etc. In other embodiments, the vector functional units 175 perform the same function, for example, multiple ALUs. Furthermore, the invention is not limited to integer vector functional units. In other embodiments the vector functional units include floating point units, digital-signal processing units, or custom designed units.

In one embodiment, the vector registers are grouped by 2, 4, or 8 vector registers and the vector instructions operate on the vector register groups. For example, if the vector registers are grouped by 2×, 4×, or 8× the reference to vector register 8 (v8) includes all registers in the group, so v8-v9, v8-v11, or v8-v15, respectively. For example, with 4× grouping, a vector add instruction adds 4 source vector registers to 4 source vector registers and writes back to 4 destination vector registers. The vector instruction with 4× grouping can be executed in 4 consecutive cycles with 4 micro-operations where each micro-operation is a vector add operation of adding 2 source vector registers and writing the result data to 1 destination vector register. The micro-operation field 179 of the vector execution queue 170 indicates the number of micro-operations which could be executed in consecutive cycles by a vector functional unit 175. At the read time 177 of the vector instruction in the execution queue 170, the vector instruction is dispatched to the functional unit 175 in consecutive cycles according to the value in the micro-operation field 179. For example, with 8× register grouping and the modified VLEN=4×, then the vector functional unit is busy for 32 clock cycles to execute 32 micro-ops as shown in the second row of the execution queue 170. When the vector instruction with multiple micro-operations is issued from the vector issue unit 155, the resources for the micro-operations must be available from the vector time resource matrix 150 in consecutive cycles. All micro-operations of the vector instruction are issued or stalled in the vector issue unit 155 as a group. The read control unit 162 and the write control unit 164 are synchronized with the vector execution queue 170 for consecutive cycles to provide the source operand data from vector register file 160 and to write back data to the vector register file 160, respectively. In another embodiment, each micro-operation of the vector instructions can be issued independently, instead of in consecutive cycles where each micro-operation has an independent read time and independently accesses the vector time resource matrix 150.

The described operations of FIGS. 2-6 are the same for baseline vector instructions or custom vector instructions of a vector coprocessor 100. The static scheduling of instructions in a microprocessor with a time counter 190 simplifies the design of a coprocessor with custom and/or extended instructions. At design time at the RTL level, in some embodiments, the units related to the custom and extended instructions as shown in the block diagram of FIG. 2 can be specified using software scripts. For example, a hardware description language (such as Verilog) that describes the functions performed by the additions of the custom and/or extended instructions of FIG. 2 can be modified by software scripts. The vector execution queues 170 and the vector functional units 175 are designed to be configurable for any custom or extended instructions which can be added to the microprocessor 10 by a software script. In one embodiment, custom functional units can be added to a particular implementation of the microprocessor 10 by adding new instruction decode table and parameters. A software script instantiates the custom decode block, functional units, and execution queue to the design. In another embodiment that employs another simpler customization, the number of functional units (same type) 175 can be added or removed by setting parameters which can be used by a software script to modify the instantiation of the functional units. The vector execution queues 170 receive instructions from the issue unit and send to the functional units which are added and removed by the software script.

The software scripts are part of the software representations can be implemented employing computer-executable instructions, such as those included in program modules and/or code segments, being executed in a computing system on a target real or virtual processor. The functionality of the program modules and/or code segments may be combined or split between program modules/segments as desired in various embodiments. Computer-executable instructions for program modules and/or code segments may be executed within a local or distributed computing system. The computer-executable instructions, which may include data, instructions, and configuration parameters, may be provided via an article of manufacture including a non-transitory computer readable medium, which provides content that represents instructions that can be executed. A computer readable medium may also include a storage or database from which content can be downloaded. A computer readable medium may also include a device or product having content stored thereon at a time of sale or delivery. Thus, delivering a device with stored content, or offering content for download over a communication medium may be understood as providing an article of manufacture with such content described herein.

The foregoing explanation described features of several embodiments so that those skilled in the art may better understand the scope of the invention. Those skilled in the art will appreciate that they may readily use the present disclosure as a basis for designing or modifying other processes and structures for carrying out the same purposes and/or achieving the same advantages of the embodiments herein. Such equivalent constructions do not depart from the spirit and scope of the present disclosure. Numerous changes, substitutions and alterations may be made without departing from the spirit and scope of the present invention.

Although illustrative embodiments of the invention have been described in detail with reference to the accompanying drawings, it is to be understood that the invention is not limited to those precise embodiments, and that various changes and modifications can be affected therein by one skilled in the art without departing from the scope of the invention as defined by the appended claims.

What is claimed is:

1. A coprocessor that processes coprocessor instructions and that is coupled to a processor that executes instructions, the coprocessor instructions including a first committed coprocessor instruction, received from the processor, the coprocessor comprising:
    a vector register file comprising a plurality of vector registers;
    an extended vector register file comprising a plurality of extended registers in which the extended registers extend the data width of the vector registers of the vector register file;
    a coprocessor issue unit for receiving the first committed coprocessor instruction, and issuing the first committed coprocessor instruction; and
    a coprocessor execution queue coupled to the coprocessor issue unit to receive the first committed coprocessor instruction from the coprocessor issue unit and dispatch the first committed coprocessor instruction to a coprocessor functional unit.

2. The coprocessor of claim 1 further comprising:
    a control register and a status register that determine a modified data width of an extended vector register, wherein the modified data width of the extended vector register equals a sum of the width of the vector register and the width of the extended vector register.

3. The coprocessor of claim 2 wherein one or more vector registers of the vector register file is determined by the control and status register to be extended by the extended registers of the extended vector register file.

4. The coprocessor of claim 1 wherein the coprocessor instructions include a custom vector instruction that extends a length of one or more registers of the vector register file by associating with the one or more registers of the vector register file, one or more registers of the extended vector register file.

5. The coprocessor of claim 3 further comprising:
    an extended vector functional unit that executes data from the extended vector register file.

6. The coprocessor of claim 5 further comprising: a custom vector instruction added for the vector register with the extended data width.

7. The coprocessor of claim 4 wherein a subset of vector instructions uses the modified vector register and wherein the subset of vector instructions is programmed in the control and status register.

8. The coprocessor of claim 7 wherein:
    the processor includes a clock circuit, and the coprocessor time counter increments the coprocessor time count with each clock cycle of the processor;
    the coprocessor preset execution time is correlated to the coprocessor time count based upon the clock cycle;
    the coprocessor time counter comprises a coprocessor N-bit counter wherein an Nth-bit count value represents a largest future time for the coprocessor issue unit to dispatch a coprocessor instruction;
    the coprocessor N-bit counter returns to a zero count after reaching the Nth-bit count value;

the coprocessor issue unit issues the first committed coprocessor instruction with a preset coprocessor execution time based on the coprocessor time count; and the coprocessor execution queue dispatches the first committed coprocessor instruction to a coprocessor functional unit based upon coprocessor the time count.

9. The coprocessor of claim 8 wherein the coprocessor further includes a vector register scoreboard storing:

a write time of a vector register in a vector register file, wherein the write time represents a future time relative to the coprocessor time count; and a read time of a vector register in the vector register file, wherein the read time represents a future time relative to the coprocessor time count;

wherein the coprocessor issue unit reads at least a write time and a read time for destination operands of the particular vector instruction from the vector register scoreboard, and uses the write time and read time to determine an execution time for the particular vector instruction.

10. The coprocessor of claim 8 wherein the coprocessor further includes:

a vector time-resource matrix unit coupled to the vector register scoreboard and the coprocessor time counter for storing information relating to available vector resources for at least some time counts of the coprocessor N-bit time counter, and wherein the available vector resources include at least one of: a plurality of vector read buses, a plurality of vector write buses, and a plurality of vector functional units;

wherein the coprocessor issue unit is coupled to the vector time resource matrix unit to receive vector data therefrom and to issue a vector instruction if all the vector resources indicated by the vector time-resource matrix are available, and to stall the vector instruction if any of the vector resources is not available; and wherein multiple consecutive times are set for the vector instructions with extended vector registers.

11. The coprocessor of claim 8 wherein the coprocessor further includes:

a vector read control unit storing coprocessor time count entries in the vector register file to indicate when a corresponding entry may be read and transported on a vector read bus; and a vector write control unit storing coprocessor time count entries in the vector register file to indicate when vector result data are transported from a vector write bus and written to a vector register of the vector register file.

12. The coprocessor of claim 8 wherein the coprocessor is a vector processor and wherein the coprocessor instructions take the form of vector instructions and wherein the coprocessor execution queue stores a plurality of vector instructions, and wherein each vector instruction includes a read time which is a future time relative to the coprocessor time count and wherein the coprocessor execution queue dispatches vector instructions to at least one coprocessor functional unit, and wherein the coprocessor execution queue further comprises a micro-operation count for issuing of micro-operations of the coprocessor vector instruction in consecutive cycles.

13. The coprocessor of claim 12 wherein the vector read control unit is synchronized with the read time in the coprocessor execution queue.

14. The coprocessor of claim 8 wherein the coprocessor time counter is frozen when result data are not valid at the preset execution time or read data from the vector register file are not accepted by the coprocessor functional unit and wherein the coprocessor time counter is unfrozen when the result data are valid or the read data are accepted by the coprocessor functional unit, and wherein the coprocessor functional unit further comprises:

a latency counter which is set to equal a latency time of a coprocessor instruction when the coprocessor instruction is received by the coprocessor functional unit, the latency counter causing result data to be written back to a vector register of the vector register file upon counting down to zero; and an alternative time counter that continues incrementing when the coprocessor time counter is frozen and the latency counter is not zero, wherein the alternative time count generated by the alternative time counter is used for writing back data to the register file from the coprocessor functional unit.

15. The coprocessor of claim 1 further comprising a vector data memory wherein the vector data memory includes multiple entries of a data width based on the vector register and the extended vector register to read and write directly to the vector registers and the extended vector registers.

16. A processor comprising:

a clock circuit;

a re-order buffer to commit a first coprocessor instruction for processing by a coprocessor coupled to the processor;

the coprocessor comprising, a coprocessor time counter storing a coprocessor time count representing a current time of the coprocessor, wherein the coprocessor time count is incremented with each cycle of the clock circuit;

a vector register file comprising a plurality of vector registers;

an extended vector register file comprising a plurality of extended registers in which the extended registers extend registers of the vector register file;

a coprocessor instruction issue unit coupled to the coprocessor time counter for receiving a first coprocessor instruction, and issuing the first coprocessor instruction with a preset coprocessor execution time based on the coprocessor time count;

a coprocessor execution queue coupled to the coprocessor time counter and the coprocessor instruction issue unit to receive the first coprocessor instruction, and dispatch the first coprocessor instruction to a functional unit when the coprocessor time count matches the preset coprocessor execution time;

a coprocessor register scoreboard storing a write time of a coprocessor register in a coprocessor register file, wherein the write time is a future time specified by the coprocessor time count;

a coprocessor instruction decode unit coupled to the coprocessor register scoreboard in which the coprocessor instruction decode unit reads write times for source operands of a coprocessor instruction from the coprocessor register scoreboard, and uses the write times to determine an execution time for the coprocessor instruction;

a coprocessor time-resource matrix coupled to the coprocessor register scoreboard and the coprocessor time counter for storing information relating to available coprocessor resources for each coprocessor time count of the coprocessor time counter, and wherein the available coprocessor resources include at least one of: a plurality of coprocessor read buses, a plurality of coprocessor write buses, and a plurality of coprocessor functional units.

17. A computer program product for issuing an instruction to a coprocessor, the computer program product stored on a non-transitory computer readable storage medium and including instructions for causing a computer system to execute a method that is executable by a processor, the method comprising:

committing the instruction for execution by the coprocessor wherein the instruction references to a modified vector register which combines a data width of a vector register in a vector register file and a data width of an extended vector register in an extended register file; and issuing the instruction to an execution queue in the coprocessor to execute by a vector functional unit.

18. The computer program product of claim 17 wherein the method further comprises:

executing a vector instruction that consumes one or more cycles depending on the data width of the vector functional unit in comparison to the total data width of the vector register and the extended vector register.

19. The computer program product of claim 18 wherein the method further comprises:

specifying the data width of a vector register and the data width of a functional unit for a type of vector instruction type.

20. The computer program product of claim 19 wherein the method further comprises:

periodically incrementing the time counter up to a maximum time count corresponding to the latest future time to issue an instruction; and storing a write time of a register of a register file wherein the write time represents a future time based on the time count.

21. The computer program product of claim 20 wherein the method further comprises:

storing information corresponding to available resources for each time count in a time-resource matrix, wherein the resources comprise at least one of a plurality of read buses, a plurality of write buses, and a plurality of functional units including a plurality of coprocessor functional units;

storing a first register of a register file in a read bus control, wherein the first register is read from the register file and transported on a read bus;

storing a second register of the register file in a write bus control wherein result data are transported from a write bus and written to the second register of the register file;

storing a plurality of instructions in an execution queue wherein each instruction includes a read time specified by the time count; and synchronizing each read time stored in the execution queue with a read bus control unit.

22. The computer program product of claim 20 wherein the method further comprises:

storing a micro-operation count for dispatching of micro-operations of a particular instruction to a coprocessor functional unit in consecutive cycles.

23. The computer program product of claim 20 wherein the method further comprises:

freezing the time counter when the result data are not valid at the preset time or the read data from the register file are not accepted by the coprocessor functional unit; and unfreezing the time counter when the result data are valid or the read data are accepted by the coprocessor functional unit.

24. The computer program product of claim 23 wherein the method further comprises:

operating the coprocessor functional unit to set at least a latency counter when the coprocessor instruction is received by the coprocessor functional unit;

counting the latency counter down to zero to write result data to a register of the register file; and operating an alternative time counter which generates an alternative time count to continue incrementing when the time counter is frozen and the latency counter is not zero wherein the alternative time count is used for writing back data to the register file from the coprocessor functional unit.

25. The computer program product of claim 17 wherein the method further comprises: storing vector load data to a vector data memory wherein the vector load data are part of the vector load instructions to store data to a modified vector register.

* * * * *